Jan. 17, 1961 J. BAUDE 2,968,745
CONTROL SYSTEM FOR THE AMBIENT TEMPERATURE OF A THERMAL RELAY
Filed May 7, 1957 2 Sheets-Sheet 1
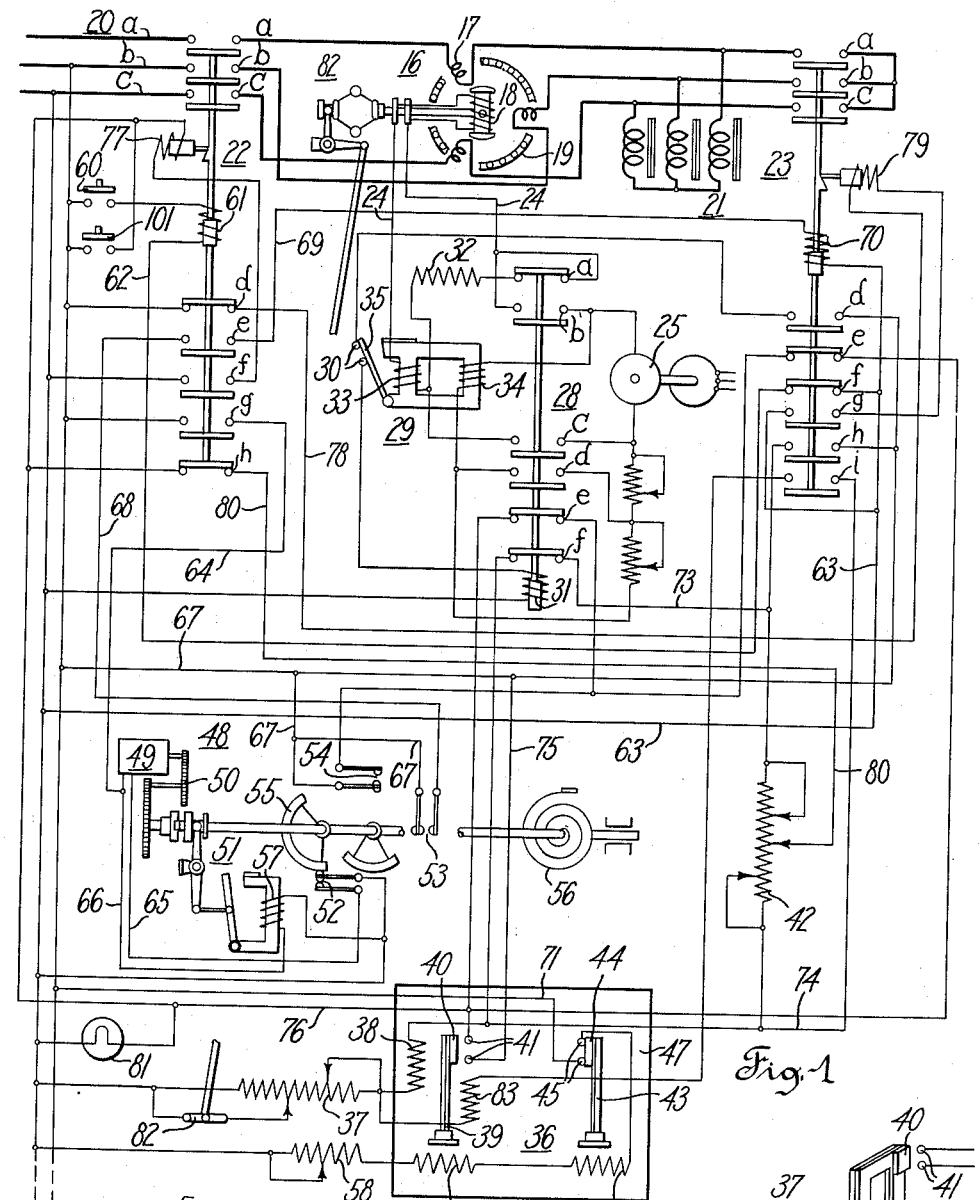
Fig. 1
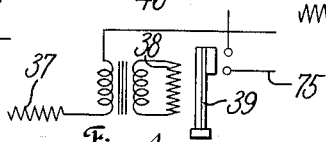
Fig. 3
Fig. 4
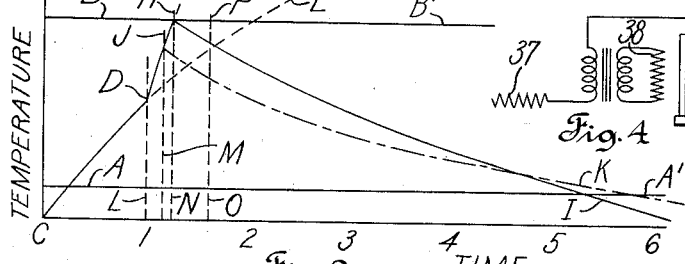
Fig. 2
Inventor
John Baude
By Warner F.B. Lindley
Attorney United States Patent Office 2,968,745
Patented Jan. 17, 1961

2,968,745

CONTROL SYSTEM FOR THE AMBIENT TEMPERATURE OF A THERMAL RELAY

John Baude, Milwaukee, Wis., assignor to Allis-Chalmers Manufacturing Company, Milwaukee, Wis.

Filed May 7, 1957, Ser. No. 657,605

6 Claims. (Cl. 317—13)

This invention relates to control arrangements and devices for electrical equipment and particularly to systems and devices for controlling the connections of an alternating current machine so as to protect it against predetermined abnormal conditions. More particularly this invention relates to control devices for protecting a secondary winding of an alternating current motor, such as a squirrel cage winding of a synchronous motor, from becoming overheated by the currents induced therein when the motor is operating subsynchronously.

Heretofore an attempt has been made to protect synchronous motors by thermal relays which lock the motor out should synchronization fail to occur within a definite time after starting. The time characteristic of this type of relay had to be such that the motor would have time enough to start both at reduced voltage and at full voltage. As a result of the relatively long time setting of the thermal relay for reduced voltage starting, the synchronous motor cage winding remained unprotected under conditions of pull out because the cage winding can operate under full voltage operating conditions only a very short time without overheating.

In order to illustrate the problem with a specific example, assume that a synchronous motor operating at fifty percent of normal voltage can use its cage winding for approximately one minute without overheating it. Since the heating of the cage winding varies with the square of the voltage, the same motor can operate only one-fourth of this time, or fifteen seconds at full voltage. It is obvious then that a relay which functions to protect the cage winding under all conditions and still permits sufficient time for starting on both reduced voltage and full voltage will have to be a relay which has not an invariable time characteristic, but which has a time characteristic which is adjustable to be coordinated with the magnitude of the voltage applied to the motor terminals.

In accordance with this invention, new and improved control systems and devices are provided by which the characteristics of a first thermal relay are changed on a coordinate basis with primary circuit breaker operations to simulate the effect of motor terminal voltage variations. A means is provided which is cut in or out of the heater coil circuit of the first thermal relay depending upon the circuit breaker position. These new and improved control arrangements and devices for starting synchronous machines are provided so that the first thermal relay and associated equipment are correlated with the rates of heating and cooling of a secondary winding, such as the cage winding of a synchronous motor, to determine whether or not the motor control arrangement can respond to another motor starting operation. In order to increase the accuracy of operation of the first thermal relay under all operating conditions a second thermal relay is electrically connected to the source for controlling the ambient temperature around the first thermal relay.

It is therefore one object of this invention to provide a new and improved thermal relay device.

Another object of this invention is to provide a new and improved thermal relay unit for controlling a plurality of circuit breaker structures.

A further object of this invention is to provide a new and improved control arrangement compensated for ambient temperature variations which is correlated with the connections of an alternating current motor so as to protect the motor against predetermined abnormal operating conditions.

Another object of this invention is to provide a new and improved ambient temperature compensated control arrangement for starting a synchronous motor in which the motor is protected against restarting unless its cage winding has cooled to a predetermined temperature.

Objects and advantages other than those set forth will be apparent from the following descriptions when read in connection with the accompanying drawing, in which:

Fig. 1 is a diagrammatic view of a synchronous motor and a control thermal relay device therefor embodying the present invention;

Fig. 2 is a graph showing the operating characteristics of the thermal relay illustrated in Fig. 1;

Figure 5:
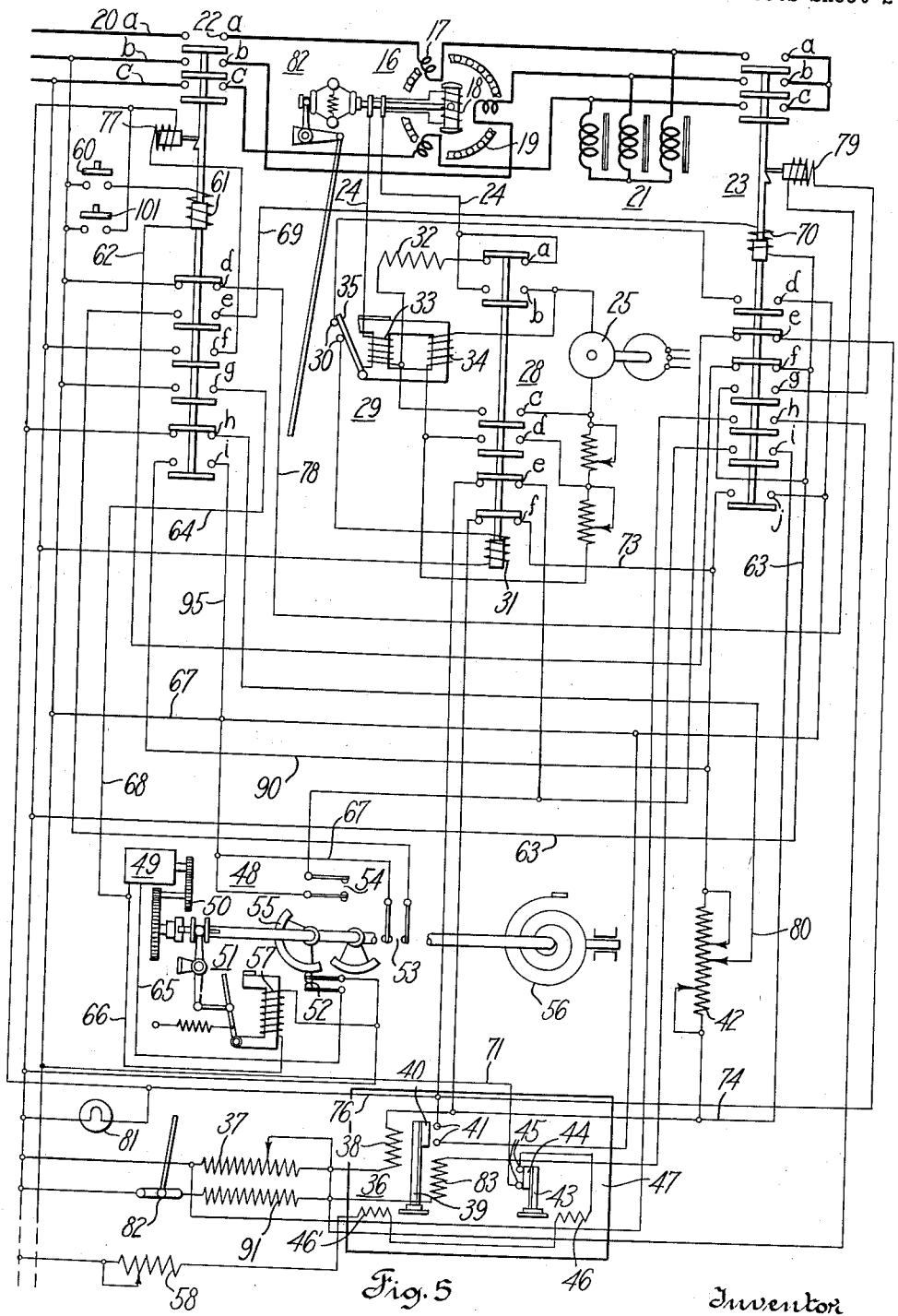

Fig. 3 partially illustrates diagrammatically a modification of Fig. 1 wherein the bimetallic element and heater of the thermal relay structure is a unitary device with the current flowing through the bimetallic element;

Fig. 4 illustrates diagrammatically a modification of the system of Fig. 1 wherein the heater of the thermal relay structure is connected across the secondary winding of a transformer; and Fig. 5 illustrates diagrammatically a modification of the system of Fig. 1 wherein the thermal relay is connected to start heating at the instant that the starting breaker is closed.

Referring more particularly to the drawings by characters of reference, Fig. 1 illustrates an alternating current machine such as a synchronous motor 16 having an armature or primary winding 17, a field or secondary winding 18, and another secondary or squirrel cage winding 19. The synchronous motor 16 is connected to a suitable source 20 of current, such as sixty cycle alternating current, indicated by conductors 20a, 20b and 20c, through connections including a starting reactor 21 and circuit breakers 22 and 23, which may be referred to as starting and running breakers, respectively. The field winding 18 is connected in series with a field discharge resistor 32 in a circuit 24 by a normally closed contact 28a of the field contactor or breaker 28. An exciter 25 may be driven from synchronous motor 16 or may be driven, as shown, by a separate motor and is used for exciting the field winding 18. The field winding 18 is connected to and disconnected from the exciter 25 by means of contacts 28b and 28c of the field contactor or breaker 28. Contactor 28 is controlled by means of a field application relay 29, which has contacts 30 in circuit with a coil 31 of the contactor 28.

Field application relay 29 is a simple, rugged device operable to close contacts 30 after acceleration of motor 16, when the frequency and magnitude of the induced current in field winding 18 have diminished to the desired values. Relay 29 has a winding 33 which is energized with a current proportional to the current in field winding 18. A coil 34 provides a substantially constant flux component in one direction through the core of relay 29, by reason of the energization of coil 34 from substantially constant voltage direct current source, such as the exciter 25. Armature 35 is operatively responsive to the sum of the fluxes produced by coils 33 and 34. A detailed description of this particular field application relay 29 may be found in the United States Patent 2,478,693, W. J. Herziger, dated August 9, 1949.

For protecting the starting reactor 21 and cage winding 19 of synchronous motor 16 from overheating during times of excessive starting duty, a new and improved heat responsive element or thermal relay device 36 is provided. This thermal relay device may have other useful applications but is particularly useful for protecting the starting or cage winding 19 of machine 16 from overheating due to overloads or unsuccessful starts, pull outs, and too frequent starts. The protection afforded by relay 36 is based upon correlated time characteristics of the new relay device for simulating heating and cooling of the cage winding 19 of motor 16.

The thermal relay device 36 comprises a current adjusting resistor 37, a heater 38, a first bimetallic element 39, a first movable contact 40 mounted on the movable end of the bimetallic element 39, stationary contacts 41, another resistor 42 which is arranged to vary the current in the heater 38, a second bimetallic element 43, a second movable contact 44 mounted on the movable end of the bimetallic element 43, stationary contact 45, heater elements 46, 46′ and an enclosure 47 for providing at least a partial shield against air currents for the bimetallic strips 39 and 43 and heater elements 46, 46′.

A motor driven transfer or timing device 48 is used to control the operation of synchronous motor 16 and comprises a motor 49, a gear train 50, an electromagnetic relay 51, contacts 52, 53 and 54, cams or other suitable contact actuating means 55, and a timing device reversing spring 56.

Fig. 2 illustrates a time temperature curve of the operating conditions of the circuit breaker system illustrated in Fig. 1 wherein the horizontal line B, B¹ represents the temperature reached by cage winding 19 when the thermal relay device locks out, and the horizontal line A, A¹ represents the temperature to which the cage winding has cooled when the thermal relay device resets. Bimetallic strip 39 is built in any suitable known manner so as to respond to temperature changes with a snap action and thereby lock out and reset at widely different temperature as represented by lines AA¹ and BB¹. Curves CDE and CDF represent the cage winding temperature rise during starting conditions of motor 16. Curve HI represents the cage winding temperature with the motor motionless, and curve JK represents cage winding temperature with the motor operating at normal speed with its field winding excited. The vertical line LD represents the time at which the transfer or timing relay 48 operates. The vertical line MJ represents the time at which the field contactor 28 normally closes its contacts 28b and 28c, the line NH represents the time at which the thermal relay device 36 locks out if contactor 28 has failed to operate, and the line OP represents the time at which the transfer or timing relay 48 locks out as explained below.

The ambient temperature of the air surrounding the bimetallic element 39 is brought under the control of the temperature sensitive or bimetallic element 43. Bimetallic element 43 is heated indirectly by currents circulating from conductor b of the source of supply 20 through a conductor 71, contacts 44 and 45 associated with bimetallic element 43, heater elements 46, 46′, an adjustable resistor 58 to conductor c of the source of supply 20. Contacts 44 and 45 will remain in contact with each other until the bimetallic element 43 is activated by heater elements 46, 46′ to separate contacts 44, 45 on rising ambient temperatures. The temperature at which contacts 44, 45 separate is usually above the highest temperature the relay device 36 encounters during an annular cycle of weather conditions. The location of heater element 46 with reference to the bimetallic element 43 is such that heating of bimetallic element 43 will take place simultaneously with an equivalent rise in air temperature within the relay enclosure 47. When current flows through heater element 46 current also flows through heater element 46′ which is located close to bimetallic element 39.

Uniform temperature increase of both temperature sensitive units 39 and 43 is achieved. Resistor 58 is adjusted to permit a current flow through heater elements 46, 46′ and contacts 44, 45 of bimetallic element 43 to maintain a given temperature in the enclosure such as 100 degrees Fahrenheit. Ambient temperature control is then provided for outside temperature of 100 degrees Fahrenheit and less. The figure of 100 degrees is an arbitrary value and may be raised or lowered to suit local conditions. A marked increase in accuracy of the thermal relay device under all operating conditions results from such an arrangement. More particularly, much greater accuracy will be obtained by using the ambient temperature control of bimetallic element 43 than without its use during the cooling period of heater 38 and bimetallic element 39 because great variations in ambient temperature and air currents are likely to affect the accuracy of the thermal relay during this operating period.

In accordance with the invention, the thermal relay synchronous motor protective system functions as follows:

Refer to Fig. 1 and assume that the motor 16 is at standstill and a starting push button switch 60 is closed. Current flows from conductor 20b through switch 60, the closing coil 61 of the starting breaker 22, a conductor 62, contacts 23f of the running breaker 23, conductor 63 and back to the power supply source conductor 20c, and the starting breaker 22 closes. The following action then occurs. The motor 16 starts to rotate and opens zero speed switch 82 connected across a part of resistor 37. The cage winding 19 and the reactor 21 start to heat up under the influence of the currents induced in the cage winding and in the field winding as indicated by curve CD in Fig. 2. The frequency of these currents, called slip frequency, is the same in both windings and gradually decreases as the motor speeds up. The intensity of the cage winding current gradually decreases in time, so that the heating of the cage winding is roughly the same during each cycle of slip frequency current.

Current induced in the field winding 18 of motor 16 is circulated through a closed circuit comprising the field winding 18, contacts 28a of field breaker 28, the field discharge resistor 32, and the field application relay coil 33. The armature 35 of the field application relay 29 is attracted to the relay's iron core and by its movement opens contacts 30, and the contacts 30 remain open until the induced current frequency in the field winding circuit has decreased to a predetermined value.

Upon the closure of starting breaker 22 a current flows from the source 20b through contacts 22g, conductor 64, timing motor 49, conductor 65, contacts 52, and back to the alternating current source 20c. Current also flows from conductor 64 through conductor 66, the coil 57 of clutch 51 and back to the alternating current source 20c. This circuit energizes clutch 51 which causes the engagement of the gear train 50 and the contact actuating means 55. The gear train 50 rotates the contact actuating means 55 counterclockwise against the action of the spring biasing means 56. After a predetermined rotation of motor 49 and of the contact actuating means 55 the timer 48 closes its contacts 53 and current then flows from the source 20b, through conductor 67, contacts 53, conductor 68, contacts 22e of starting breaker 22, conductor 69, closing coil 70 of running breaker 23 and conductor 63 to the alternating current source 20c. Upon the energization of closing coil 70 the running breaker 23 closes its contacts 23a, 23b and 23c, thereby short circuiting the reactor 21. Motor 16 and particularly primary winding 17 is put under the influence of the full supply voltage, and cage winding 19 then heats up at an increased rate as indicated by curve DJ in Fig. 2.

Upon closure of running breaker 23, current flows from the source 20b, through a conductor 67, contacts 23h of the running breaker 23, conductor 73, contacts 28f of the field breaker 28, the heater coil 38 of the thermal relay device 36 and resistor 37 back to the supply source 20c. This circuit through the field breaker contacts 28f and the heater 38 remains intact until field breaker 28 is closed to apply field to the synchronous motor or the thermal relay device 36 is heated up to the point where its contacts 41 close under the influence of the heater coil 38. The motor continues to accelerate and when it reaches a predetermined speed slightly lower than its synchronous speed relay 29 closes contacts 30 to close a circuit from source 20b, conductor 67, contacts 23d, contacts 30, closing coil 31 of contactor 28 to source 20c. Contactor 28 connects field winding 18 to exciter 25 to synchronize motor 16. Cage winding 19 then cools as indicated by curve JK.

When the field is applied to synchronous motor 16 by the operation of field breaker 28, a reduced current flows through the heater coil 38 of the thermal relay device 36 which keeps the bimetallic strip or element 39 from cooling faster than the cage winding of the synchronous machine, which cools off as indicated by curve JK. The intensity of this current used for reducing the cooling rate of the thermal relay device 36 is adjusted by means of resistor 42 which is in shunt connection with contacts 28f of the field breaker 28.

After operation of the field breaker 28 to close its contacts 28b and 28c, current flows from the source 20b, through conductor 67, through contacts 23h of running breaker 23, resistor 42, conductor 74, resistor or heater element 38, and back to the source of supply 20c. Resistor 42 and heater 38 are adjusted to have a combined resistance value which provides for action of the bimetallic element 39 of the thermal relay 36 in such a manner that the deflection position of this bimetallic strip 39 is coordinated with the cooling action of the cage winding of motor 16 under normal running conditions. Timing relay 48 continues to operate until cam 55 allows contacts 52 to open to deenergize motor 49. Clutch 51, however, remains energized, so that cams 55 are held stationary by motor 49 against the action of spring 56. Contacts 54 are thereby held closed.

The operating condition of relay device 36 is indicated by the action of the indicating lamp 81. Lamp 81 is energized as follows: cage winding 19 reaches its limit temperature indicated by point H. If the field breaker 28 did not close its main contacts 28b and 28c in the proper time interval, relay device 36 then closes its contacts 40, 41 and current flows from the source 20b, through conductor 67, conductor 75, contacts 40, 41 of thermal relay device 36, a conductor 76, the indicating lamp 81 back to the source of supply 20c. Further, current flows from the source 20b, through conductor 67, conductor 75, contacts 40, 41 of thermal relay device 36, conductor 76, trip coil 77 of starting breaker 22, contacts 22f of breaker 22 and back to the source 20c. The starting breaker 22 trips upon the energization of trip coil 77 and deenergizes motor 16. The running breaker 23 is also opened by the opening of starting breaker 22 and the closing of contacts 22d thereof. Upon the engagement of contacts 22d, current flows from the supply source 20b through contacts 22d, conductor 78, a trip coil 79 of running breaker 23, the contacts 23g of running breaker 23, conductor 63, and back to the supply source 20c. Upon the energization of trip coil 79, breaker 23 opens its contacts 23a, 23b and 23c and motor 16 comes to standstill. Coil 57 of clutch 51 is deenergized to disconnect cams 55 from gear train 50, and spring 56 returns cams 55 to the starting position shown.

After circuit breakers 22 and 23 have been tripped under the influence of the operation of contacts 40, 41 of the thermal relay device 36 as just described, current still circulates through the heater 38 of relay device 36 to provide the heat necessary to control the rate of deflection of the bimetallic element 39 so that the rate of cooling of element 39 simulates the rate of cooling of the cage winding of motor 16 when motionless, indicated by curve HI. Upon the opening of circuit breakers 22 and 23 by the action of contacts 40 and 41 of relay device 36, current flows from the source 20b, through conductor 67, conductor 75, contacts 40, 41 of thermal relay device 36, conductor 76, contacts 22h of starting breaker 22, a conductor 80, the tap of resistor 42, a conductor 74, heater 38, a part of resistor 37, switch 82 and back to source of supply 20c. The current flowing through the heater 38 retards the deflection of element 39 to a point where it simulates the cooling time of the cage winding when the motor is motionless.

When cage winding 19 has cooled off sufficiently, relay device 36 has cooled to the point that its contacts 40, 41 disengage, the lamp 81 is deenergized which indicates to the operator the possibility of a new starting cycle of the motor, the system then being returned to the original condition shown. Before the contacts 40 and 41 separate one current flows through the heater 38. After the contacts 40 and 41 separate, lower current flows through the heater 38. Thus the value of the current flowing depends on the positions of the contacts 40 and 41 and the bimetallic element 39.

During starting, if running breaker 23 fails to operate before timer closes contacts 54, a circuit is established from source 20b through conductor 67, contacts 54, contacts 23e, conductor 76, trip coil 77, contacts 22f back to source 20c. Starting breaker 22 opens to shut down motor 16.

If the motor is running and pulls out of step, the alternating current component induced in the field circuit causes relay 29 to open contacts 30, thereby causing contactor 28 to return to the position shown. A circuit is then established from source 20b through conductor 67, contacts 54, contacts 28e, conductor 76, trip coil 77, contacts 22f back to source 20c to open starting breaker 22 and shut down motor 16. If automatic resynchronization is required after pull out, contacts 28e must be disconnected to prevent the tripping of the starting and running breakers by means of contacts of the field breaker.

If motor 16 fails to rotate in response to closure of breaker 22, switch 82 remains closed. In this manner the heating of relay device 36 is increased to correspond to the heating of cage winding 19 while the rotor 18 is locked to shut down the system in the manner above set forth.

After the running breaker 23 has closed its main contacts 23a, 23b and 23c, motor 16 and its cage winding 19 are protected under pull out conditions in the same manner as during starting. Consequently, if automatic synchronization after pull out is desired, special pull out relays are not required and the operator can take advantage of the thermal capacity which is left in the cage winding for an immediate repeated start since the motor and cage winding are protected by the simulated action of the thermal relay device 36.

Motor 16 is provided with a zero speed switch 82 which is used to cut out part of the resistance of resistor 37 upon starting of motor 16. Further, another heater coil 83 may be connected in parallel with part of heater 38, as shown, and in series with contacts 23i of running breaker 23 to provide a means for further changing the rate of deflection of bimetallic element 39. It is also within the scope of this invention to provide the bimetallic element 39 and the heater 38 as a unitary device as shown in Fig. 3 with the current flowing through the deflecting element of the relay device 36.

If it is desired to shut down motor 16 manually this can be accomplished by closing push button 101, causing current to flow from the source 20b through push button 101, trip coil 77, contacts 22f of running breaker 22 and back to the source of supply 20c.

Fig. 4 illustrates another way in which the thermal relay device 36 may be arranged wherein the heater 38 is placed across the secondary winding of a suitable transformer. As illustrated in Fig. 3, heater 38 shown in Fig. 4 may be combined with the bimetallic element 39.

Fig. 5 illustrates a variation of the control scheme illustrated in Fig. 1. In Fig. 5 the thermal relay is reconnected in such a way that heating of the thermal relay device 36 starts at the instant that the starting breaker 22 is closed. This is accomplished by adding contact 22i to the starting breaker 22 and connecting the heater 38 from the source of power 20b through conductor 67, conductor 95, contacts 22i, conductor 90, resistor 42, conductor 74, heater 38, resistor 37 to the supply source 20c. The contact 23h of the running breaker is connected in parallel with a resistor 37. A contact 23j of the running breaker 23 is connected in parallel with contacts 22i of the starting breaker 22 to provide a connection for circulating a residual current through the thermal relay for controlling the rate of cooling of thermal device 36.

Electrical operation of the control scheme illustrated in Fig. 5 is essentially the same as previously described for the control scheme illustrated in Fig. 1 with the exception that the current flow through the thermal relay device 36 is initiated by the contacts 22i of the starting breaker. The thermal relay device 36 starts to heat immediately upon the closing of the starting breaker 22 and heats at a rate which is coordinated with the rate of heating of the cage winding 19 of motor 16. This rate of heating of cage winding 19 continues until the running breaker 23 closes and its auxiliary contacts 23h close and short circuit the resistor 37.

During the synchronous motor starting procedure, if the starting breaker 22 closes, the zero speed switch 82 at first stays closed, the field breaker 28 stays open and the running breaker 23 closes under the influence of the action of the motor driven timer 48. The resistor 37 is short circuited by the operation of contact 23h. Short circuiting resistor 37 causes the maximum current flow through the thermal relay device 36 to reduce the time delay of the relay.

During the synchronous motor starting sequence, if the running breaker fails to close when its closing circuit is energized, and the transfer relay 48 functions properly, the thermal relay device 36 heats until its contacts 40, 41 engage. Since the transfer relay 48 is equipped with contacts 54 which close to lock out the starting breaker 22 in case the whole starting procedure is unsuccessful, it is necessary that the time required to close contacts 54 be at least equal to the time required to close contacts 40, 41 of the thermal relay device 36. In practice it is desirable to set the motor driven lockout contact 54 of the transfer relay 48 for somewhat longer time in order to avoid interference between thermal relay 36 and a motor driven transfer relay 48.

The conditions under which the thermal relay cools should be arranged to match the various possible operating conditions under which the cage winding of the synchronous machine, as well as the reactor, assumes normal operating temperatures after a starting period has elapsed, or after the machine is shut down and before it can be restarted. After completion of the starting cycle, a residual current is circulated through the thermal relay device 36 for delaying the natural cooling of the thermal relay to the point where it will match the somewhat slower rate of cooling of the cage winding of the motor and the reactor. The cooling operation of relay device 36 in this control system is similar to that of relay device 36 in Fig. 1.

Since all three devices, namely the cage winding, the starting reactor and the thermal relay, heat up during the starting cycle, repeated attempts to restart the motor are accurately registered by the accumulated heat in the thermal relay. Heating of the relay device followed by insufficient cooling eventually builds up the temperature within the terminal relay device to the point where it will lock out the motor. Therefore, a careless or inexperienced operator is fully protected against damaging the motor by repeated unsuccessful efforts to get it started. The thermal relay device locks the starting breaker out for a period of approximately six to ten minutes, the time depending upon whether the rotor is still in rotation or is completely locked by an overload.

Although but a few embodiments of the present invention have been illustrated and described, it will be apparent to those skilled in the art that various changes and modifications may be made therein without departing from the spirit of the invention or from the scope of the appended claims.

What is claimed is:

1. In combination, a circuit breaker connected to a source of electric power, a first thermal device electrically connected to said breaker, means for enclosing said first device, means for closing said breaker to cause a first current to flow from said source through said breaker to said first device, means for changing the resistance of said first device for sequentially causing a second lower current to flow through said first device, means for opening said breaker, said first device upon reaching a predetermined temperature actuating said opening means to open said breaker, means actuated by said breaker upon movement to open position for connecting said first device to said source to cause a third lower current to flow through said first device to retard to a predetermined value the rate of cooling of said first device, and means mounted within said enclosure means comprising a pair of cooperating contacts, a second thermal device and a resistance element electrically connected in series with said source, said second device controlling said contacts to connect and disconnect said second device with said source, said resistance element upon opening and closing of said contacts controlling the ambient temperature around said first device to increase the accuracy of operation of said first device under all operating conditions.

2. In combination, a first circuit breaker connected to a source of electric power, a second circuit breaker connected to said source, a first thermal relay electrically connected to said first and second breakers, means for enclosing said first device, relay means electrically connected to said second breaker, means for closing said first breaker to cause a first current to flow from said source through said first breaker to said first relay, means for closing said second breaker upon a predetermined actuation of said relay means, means responsive to the closing of said second breaker for connecting said first relay to said source to cause a second lower current to flow through said first relay to retard to a predetermined value the rate of cooling of said first relay, and a second relay mounted within said enclosure means and electrically connected in series with said source for controlling the ambient temperature around said first relay to increase the accuracy of operation of said first relay under all operating conditions.

3. In combination, a circuit breaker connected to a source of electric power, a first thermal device electrically connected to said breaker, means for enclosing said first device, means for closing said breaker to cause a first current to flow from said source through said breaker to said first device, means for opening said breaker, said first device upon reaching a predetermined temperature actuating said opening means to open said breaker, means actuated by said breaker upon movement to open position for connecting said first device to said source to cause a second lower current to flow through said first device to retard to a predetermined value the rate of cooling of said first device, said first device upon cooling to a predetermined temperature disconnecting said opening means from said breaker and reconnecting said closing means to said breaker, and a second thermal device mounted within said enclosure means and electrically connected in series with said source for controlling the ambient temperature around said first device to increase the accuracy of operation of said first device under all operating conditions.

4. In combination, a first circuit breaker connected to a source of electric power, a second circuit breaker connected to said source, a first thermal relay means electrically connected to said first and second breakers, means for enclosing said first device, means for closing said first breaker to cause a first current to flow from said source through said first breaker to said first relay means, means for closing said second breaker upon a predetermined actuation of said first relay means, means for opening said first and second breakers, said first relay means upon reaching a predetermined temperature actuating said opening means to open said first and second breakers, means responsive to the opening of said second breaker for connecting said first relay means to said source to cause a second lower current to flow through said first relay means to retard to a predetermined value the rate of cooling of said first relay means, and a second relay means mounted within said enclosure means and electrically connected in series with said source for controlling the ambient temperature around said first device to increase the accuracy of operation of said first device under all operating conditions.

5. In combination, first and second circuit breakers connected to a source of electric power, a timing device electrically connected to said first breaker, a first thermal relay electrically connected to said second breaker, means for enclosing said first relay, means for closing said first breaker to cause a first current to flow from said source through said first breaker to actuate said device, means for closing said second breaker upon a predetermined actuation of said device, means for opening said first and second breakers, said breaker upon closure thereof causing a first current to flow through said first relay, said first relay upon reaching a predetermined temperature actuating said opening means to open said first and second breakers, means responsive to the opening of said first and second breakers for connecting said first relay through said second breaker to said source to cause a second lower current to flow through said second relay to retard to a predetermined value the rate of cooling of said first relay, and a second thermal relay mounted within said enclosure means and electrically connected in series with said source for controlling the ambient temperature around said first relay to increase the accuracy of operation of said first relay under all operating conditions.

6. In combination, first and second circuit breakers connected to a source of electric power, a timing device electrically connected to said first breaker, a thermal relay electrically connected to said second breaker, means for enclosing said relay, means for closing said first breaker to cause a first current to flow from said source through said first breaker to actuate said device, means for closing said second breaker upon a predetermined actuation of said device, means for opening said first and second breakers, said second breaker upon closure thereof causing a first current to flow through said relay, said relay upon reaching a predetermined temperature actuating said opening means to open said first and second breakers, means responsive to the opening of said first and second breakers for connecting said first relay through said second breaker to said source to cause a second lower current to flow through said relay to retard to a predetermined value the rate of cooling of said relay, and means mounted within said enclosure means comprising a pair of cooperating contacts, a thermal device and a resistance element electrically connected in series with said source, said thermal device controlling said contacts to connect and disconnect said thermal device from said source, said resistance element upon opening and closing of said contacts controlling the ambient temperature around said relay to increase the accuracy of operation of said relay under all operating conditions.

References Cited in the file of this patent

UNITED STATES PATENTS

| 2,338,515 | Johns | Jan. 4, 1944 |
| 2,740,929 | Baude | Apr. 3, 1956 |
| 2,758,255 | Lytle | Aug. 7, 1956 |
| 2,765,430 | Graef | Oct. 2, 1956 |
| 2,774,929 | Schaefer | Dec. 18, 1956 |
| 2,811,678 | Baude | Oct. 29, 1957 |

FOREIGN PATENTS

| 538,118 | Great Britain | July 22, 1941 |